United States Patent
Stolz

(10) Patent No.: US 9,719,577 B2
(45) Date of Patent: Aug. 1, 2017

(54) MECHANICAL ROPE WEDGE

(71) Applicant: CATERPILLAR INC., Peoria, IL (US)

(72) Inventor: Michael Robert Stolz, Franklin, WI (US)

(73) Assignee: Caterpillar Inc., Peoria, IL (US)

( * ) Notice: Subject to any disclaimer, the term of this patent is extended or adjusted under 35 U.S.C. 154(b) by 69 days.

(21) Appl. No.: 14/946,499

(22) Filed: Nov. 19, 2015

(65) Prior Publication Data
US 2017/0146094 A1    May 25, 2017

(51) Int. Cl.
*F16G 11/04* (2006.01)

(52) U.S. Cl.
CPC ............ *F16G 11/04* (2013.01); *F16G 11/046* (2013.01); *Y10T 24/3971* (2015.01); *Y10T 24/3978* (2015.01)

(58) Field of Classification Search
CPC .. Y10T 24/3971; Y10T 24/3978; F16G 11/04; F16G 11/046
See application file for complete search history.

(56) References Cited

U.S. PATENT DOCUMENTS

| | | |
|---|---|---|
| 1,248,991 A | 12/1917 | Barger |
| 3,335,470 A | 8/1967 | Baer |
| 3,905,711 A | 9/1975 | Rogers |
| 4,313,243 A | 2/1982 | Childress et al. |
| 4,536,921 A | 8/1985 | Brendel et al. |
| 4,561,154 A | 12/1985 | Briscoe et al. |
| 4,602,891 A | 7/1986 | McBride |
| RE32,847 E | 1/1989 | Briscoe et al. |
| 5,988,929 A * | 11/1999 | Doan ................. E02F 3/60 24/136 K |
| 5,988,941 A | 11/1999 | Sargent et al. |
| 6,898,827 B1 | 5/2005 | Postelwait et al. |
| 7,707,693 B2 * | 5/2010 | Schaefer ............ F16G 3/06 24/136 B |
| 8,375,527 B1 | 2/2013 | Crow et al. |
| 8,381,364 B2 | 2/2013 | Kubo et al. |
| 9,103,409 B2 | 8/2015 | Dreixler et al. |

* cited by examiner

*Primary Examiner* — Robert J Sandy

(57) ABSTRACT

A wedge assembly for holding a rope in a socket includes an inner wedge. The inner wedge includes a tapered body and a threaded hole. The inner wedge includes a first guide feature and a second guide feature. The wedge assembly includes a first outer wedge and a second outer wedge, each outer wedge including a receiving feature. The receiving features of the first outer wedge and the second outer wedge are configured to receive the first guide feature and second guide feature. The wedge assembly includes a fastener configured to actuate the inner wedge between the two outer wedges.

20 Claims, 3 Drawing Sheets

MECHANICAL ROPE WEDGE

TECHNICAL FIELD

The present disclosure generally pertains to excavation machines, and is directed toward a wedge assembly for securing rope to a socket.

BACKGROUND

Excavation machines can be used for mining applications and general earth moving operations. Excavation machines generally include rope fastened to a socket and a wedge to support other equipment such as a dragline bucket. A wedge may sit within a socket in which a rope is passed through the socket, looped around the wedge, and passed back out of the socket.

U.S. Pat. No. 9,103,409 to Dreixler et al. discloses a readily releasable wedge assembly for holding a wire rope in a socket. The readily releasable wedge assembly comprises first and second wedge components and a release assembly. The first and second wedge components are joined together adjacent respective first ends thereof at a pin connection. The first and second wedge components have respective second ends opposite the first ends, which are spaced from the first ends in a longitudinal direction. The first and second wedge components are pivotable relative to each other about the pin connection and together define an outer periphery shaped to receive a wire rope. The release assembly is positioned between the second ends of the wedge components. The release assembly is threadedly actuatable to release the first and second wedge components from an expanded position and reconfigure the wedge assembly into a contracted position allowing the wedge assembly to be removed from a socket.

The present disclosure is directed toward overcoming one or more of the problems discovered by the inventors or that is known in the art.

SUMMARY OF THE DISCLOSURE

A wedge assembly for holding a rope in a socket is disclosed. The wedge assembly includes an inner wedge. The inner wedge includes a tapered body and a threaded hole extending into the tapered body. The inner wedge includes a first guide feature extending along one side of the tapered body, and a second guide feature extending along the opposite side of the tapered body from the first guide feature. The wedge assembly includes a first outer wedge including a receiving feature. The receiving feature of the first outer wedge is configured to receive the first guide feature of the inner wedge. The wedge assembly includes a second outer wedge including a receiving feature. The receiving feature of the second outer wedge configured to receive the second guide feature of the inner wedge. The wedge assembly includes a threaded fastener configured to axially actuate the inner wedge along the receiving features of the first outer wedge and the second outer wedge.

In another embodiment, a wedge and socket assembly for holding a rope is disclosed. The wedge and socket assembly includes a socket defining a cavity. The cavity may have one end narrower than the opposite end. The wedge and socket assembly includes a wedge assembly insertable into the cavity of the socket. The wedge assembly includes an inner wedge. The inner wedge includes a tapered body and a threaded hole extending into the tapered body. The inner wedge includes a first guide feature extending along one side of the tapered body, and a second guide feature extending along the opposite side of the tapered body from the first guide feature. The wedge assembly includes a first outer wedge including a receiving feature. The receiving feature of the first outer wedge is configured to receive the first guide feature of the inner wedge. The wedge assembly includes a second outer wedge including a receiving feature. The receiving feature of the second outer wedge configured to receive the second guide feature of the inner wedge. The wedge assembly includes a threaded fastener configured to axially actuate the inner wedge along the receiving features of the first outer wedge and the second outer wedge.

In yet another embodiment, a wedge assembly for holding a rope in a socket is disclosed. The wedge assembly includes a slider. The slider includes a tapered body having a narrow end and a wide end opposite the narrow end. The slider includes a threaded hole extending into the tapered body at the narrow end. The wedge assembly includes a first wedge slidably attachable to the slider. The first wedge includes an axial retainer slot. The wedge assembly includes a second wedge slidably attachable to the slider. The second wedge includes an axial retainer slot. The wedge assembly includes a threaded fastener insertable into the threaded hole of the slider. The threaded fastener may be configured to axially actuate the slider along the inner grooves of the first wedge and the second wedge. The wedge assembly includes an axial retainer fixedly attachable to the threaded fastener. The axial retainer may be insertable into the axial retainer slots of the first wedge and the second wedge.

DETAILED DESCRIPTION

This disclosure relates to a dragline bucket rigging equipment including a hoist assembly. The hoist assembly may include a wedge assembly for securing rope within a socket. The wedge assembly may be used to secure the rope against the socket, and may be contracted to release the rope from the socket. The wedge assembly may include two outer wedges and an inner wedge between the two outer wedges. A threaded fastener connected to the inner wedge may be utilized to actuate the inner wedge between the two outer wedges. The actuation of the inner wedge between the two outer wedges may alter the width of the wedge assembly, and allow for securement and release of the rope from the socket.

Figure 1:
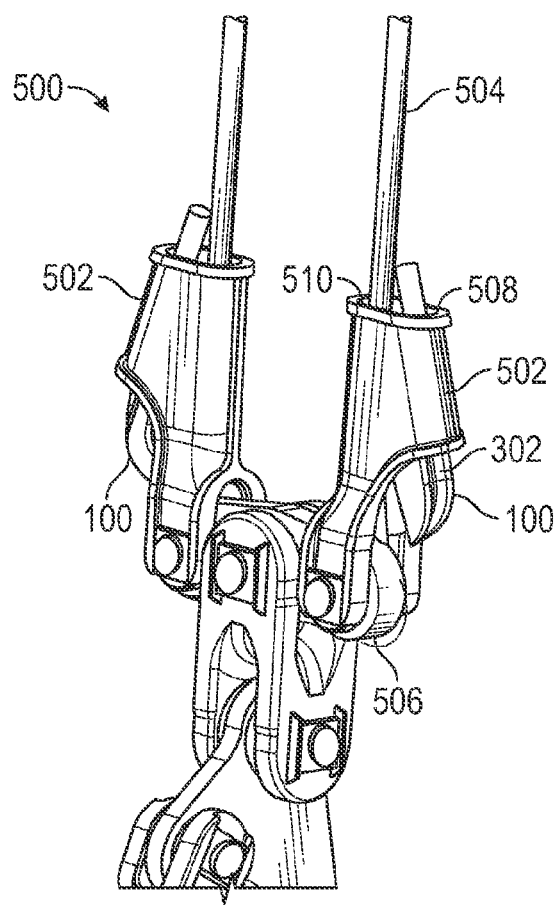
FIG. 1 is a perspective view of a hoist assembly according to an embodiment of the present disclosure.

FIG. 1 is a perspective view of a hoist assembly 500 according to an embodiment of the present disclosure. Hoist assembly 500 may include a pair of sockets 502, a pair of ropes 504, and a pair of wedge assemblies 100. Each rope 504 may be a wire rope. Each socket 502 may be pivotally connected to an equalizer 506. Each wedge assembly 100, in an expanded state, may be assembled into a cavity 510 of one of the sockets 502. Cavity 510 may be a narrowing cavity in which one end is narrower than an opposite end. Each rope 504 may extend through an aperture 508 of one of the sockets 502, loop around an outer periphery of the wedge assembly 100, and extend back out through aperture 508. Wedge assembly 100 may include an outer groove on its outer periphery for receiving the rope 504. The outer groove of each wedge assembly 100 may be configured to hold and compress the corresponding rope 504 against an interior surface of the corresponding socket 502, which may secure the corresponding rope 504 to the corresponding socket 502.

Figure 2:
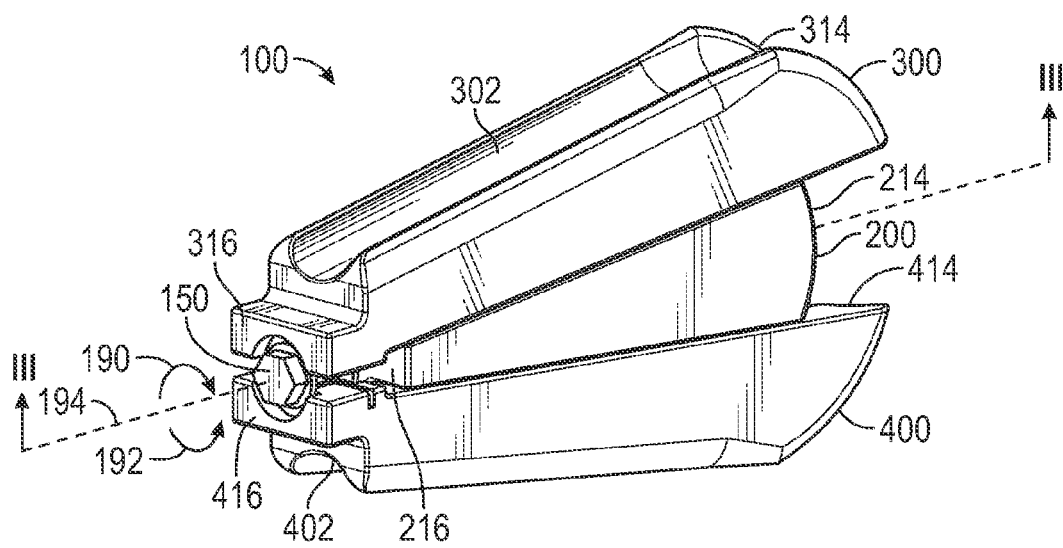
FIG. 2 is a perspective view of a wedge assembly of the hoist assembly of FIG. 1 according to an embodiment of the present disclosure.

FIG. 2 is a perspective view of the wedge assembly 100 of the hoist assembly of FIG. 1 according to an embodiment of the present disclosure. Wedge assembly 100 may include a first wedge 300 (sometimes referred to as a first outer wedge), a second wedge 400 (sometimes referred to as a second outer wedge), a slider 200 (sometimes referred to as an inner wedge), and a fastener 150. In some embodiments, first wedge 300 and second wedge 400 are identical. First wedge 300 and second wedge 400 may each be an elongated tapered wedge. First wedge 300 may have a wide end 314 and a narrow end 316, in which wide end 314 has a greater width than inner narrow 316. The body of first wedge 300 may be uniformly tapered from narrow end 316 to wide end 314. Similarly, second wedge 400 may have a wide end 414 and a narrow end 416 opposite wide end 414, in which wide end 414 has a greater width than narrow end 416. Slider 200 may also be an elongated tapered wedge.

Slider 200 may have a wide end 214 and a narrow end 216. Wide end 214 may have a greater width than narrow end 216. In addition, slider 200 may have a first side 206 and a second side 208 opposite from first side 206 (see FIG. 6). First wedge 300 and second wedge 400 may be assembled onto either side of slider 200. Moreover, first wedge 300 and second wedge 400 may be slidably engaged to slider 200.

Figure 6:
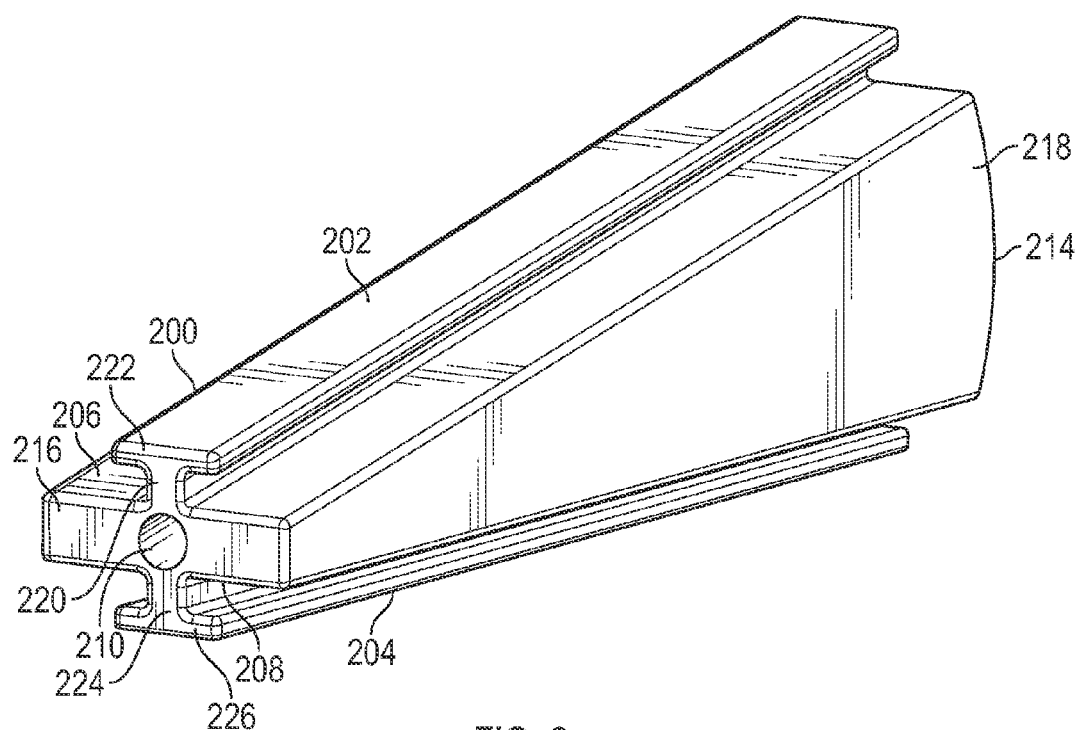
FIG. 6 is a perspective view of a slider of the wedge assembly of FIG. 2.
Figure 7:
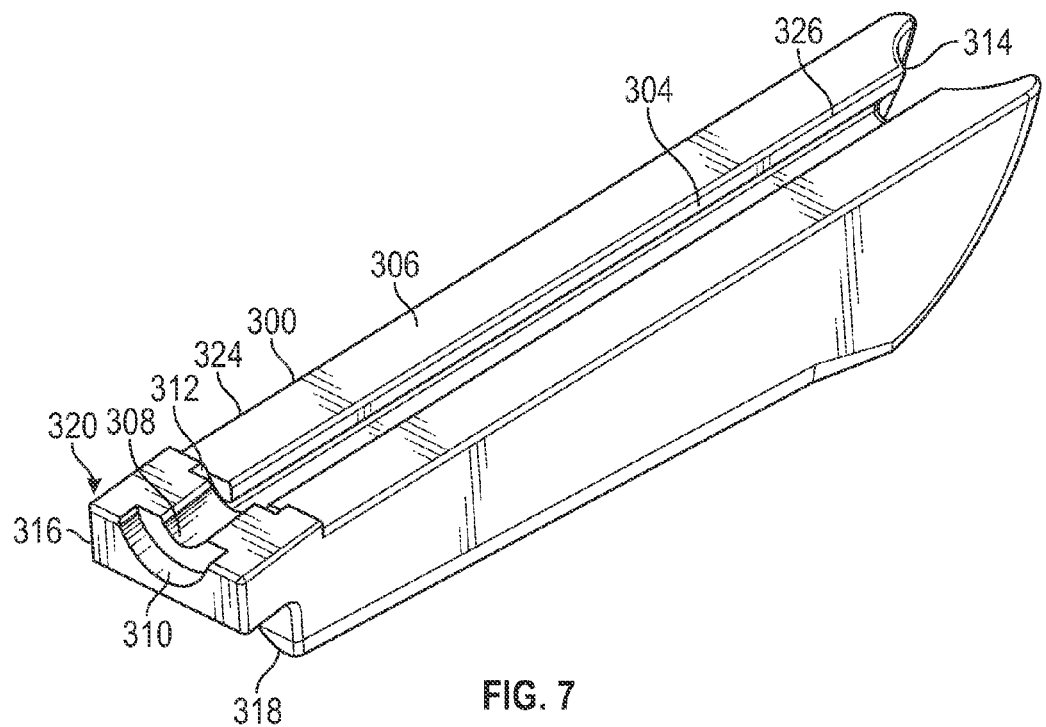
FIG. 7 is a perspective view of an outer wedge of the wedge assembly of FIG. 2.

In some embodiments, first wedge 300 and second wedge 400 may each have a receiving feature, such as inner groove 304 (see FIG. 7). The receiving feature of first wedge 300 and second wedge 400 may each engage a guide feature of slider 200, such as first guide feature 202 (see FIG. 6). The receiving features of first wedge 300 and second wedge 400 and the guide feature of slider 200 may slidably secure first wedge 300 and second wedge 400 to slider 200. Additionally, the receiving features of first wedge 300 and second wedge 400 may allow the guide feature of slider 200 to slide along the length of the corresponding receiving feature. Further details of the engagement of first wedge 300, second wedge 400, and slider 200 will be discussed in FIGS. 3 and 4 below.

Figure 3:
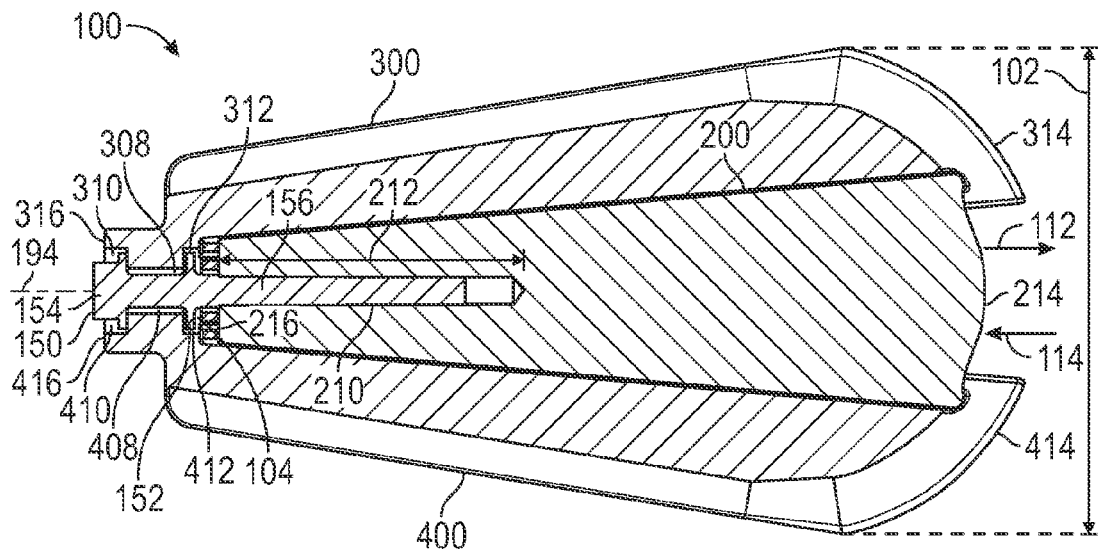
FIG. 3 is a cross sectional view of the wedge assembly of FIG. 2 taken along line III-III.

FIG. 3 is a cross sectional view of the wedge assembly 100 of FIG. 2 taken along line III-III. As shown in the figure, fastener 150 may be positioned between first wedge 300 and second wedge 400 and inserted into slider 200. Fastener 150 may be a threaded fastener, such as a screw or bolt. In some embodiments, fastener 150 is a double shoulder screw. In some embodiments, fastener 150 may include a fastener body 156 and a fastener head 154. In addition, an axial retainer 152 may be located around fastener body 156. In some embodiments, axial retainer 152 is a circular disc extending from fastener body 156. Axial retainer 152 may be fixed to fastener body 156. In other embodiments, axial retainer 152 is a snap ring coupled to a retainer groove 158 of fastener body 156 (see FIG. 5). Fastener head 154 may be located at one end of fastener body 156, and axial retainer 152 may be offset a certain distance from fastener head 154. Fastener head 154 may be located within a fastener head slot 310 of first wedge 300 and a fastener head slot 410 of second wedge 400. Fastener head slots 310 and 410 may each be a semicircular slot located at one end of first wedge 300 and second wedge 400, respectively. Furthermore, fastener body 156 may extend within a fastener groove 308 of first wedge 300 and a fastener groove 408 of second wedge 400. The fastener grooves 308 and 408 may be circular grooves extending from fastener head slots 310 and 410, respectively. Fastener grooves 308 and 408 may each have lesser diameters compared to fastener head slots 310 and 410, respectively. Axial retainer 152 may be located within an axial retainer slot 312 of first wedge 300 and an axial retainer slot 412 of second wedge 400. Axial retainer slots 312 and 412 may each be a circular slot extending from fastener grooves 308 and 408, respectively. Axial retainer slots 312 and 412 may each have similar diameters as fastener head slots 310 and 410, respectively. In some embodiments, axial retainer slots 312 and 412 are snap ring slots (see FIG. 5).

In some embodiments, fastener head 154 is enclosed by fastener head slots 310 and 410, and axial retainer 152 is enclosed by axial retainer slots 312 and 412. In some embodiments, fastener head slots 310 and 410 and axial retainer slots 312 and 412 may act as barriers to movement of fastener 150. For example, the walls of axial retainer slots 312 and 412 may prevent movement of axial retainer 152 in the direction of arrows 112 and 114. As such, fastener 150 may be fixed to first wedge 300 and second wedge 400.

As shown in the figure, fastener body 156 may be inserted into a threaded hole 210 of slider 200. Threaded hole 210 may be threaded to receive and engage a threaded fastener, such as fastener 150. Threaded hole 210 may have a depth 212 of about 1 inch to 7 inches. Fastener body 156 may be threaded. Fastener 150 may be rotated about an axis 194. Fastener 150 may be rotated in a clockwise direction as indicated by an arrow 190 (see FIG. 2), or in a counterclockwise direction as indicated by an arrow 192 (see FIG. 2). The rotational movement of fastener 150 may be converted into an axial movement of slider 200. Additional description of the axial movement of slider 200 will be discussed below.

Figures 4, 5:
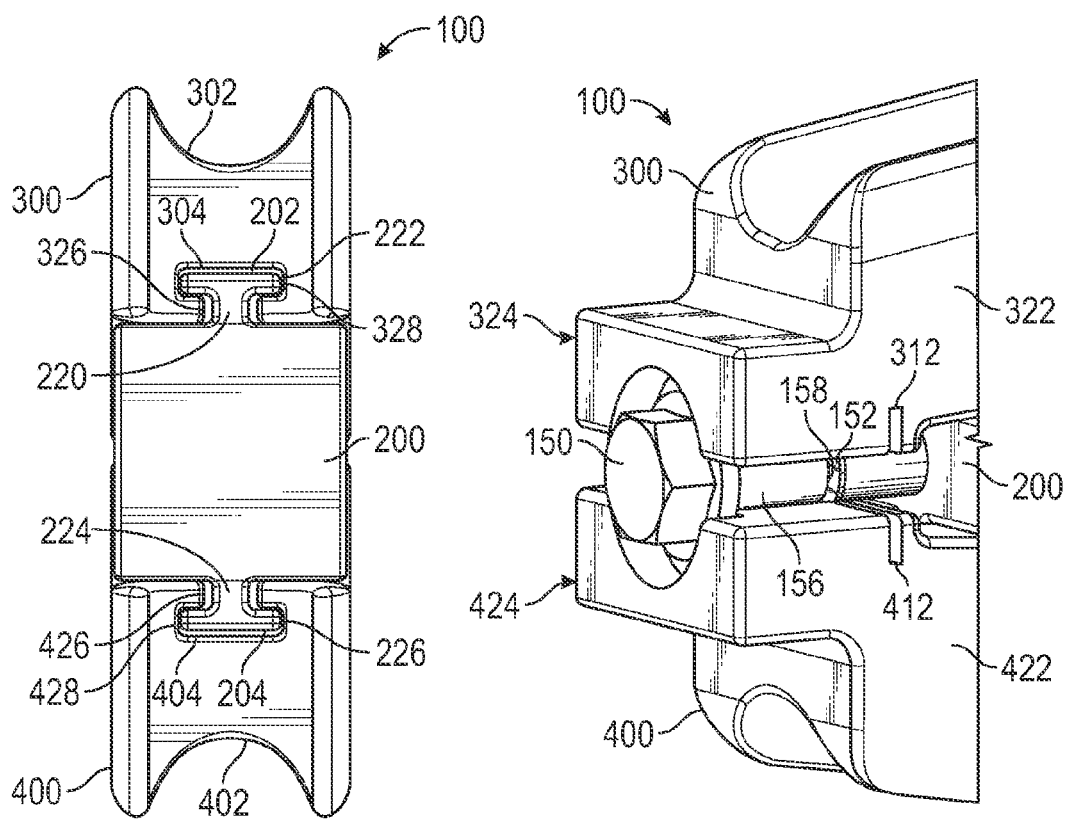
FIG. 4 is a side view of the wedge assembly of FIG. 2.
FIG. 5 is a detailed view of a portion of an alternative embodiment of a wedge assembly.

FIG. 4 is a side view of the wedge assembly 100 of FIG. 2. The figure illustrates the interfacing of first wedge 300, second wedge 400, and slider 200. In particular, the figure illustrates the coupling of the receiving features of first wedge 300 and second wedge 400 with the guide features of slider 200. As discussed above, first wedge 300 and second wedge 400 may each include a receiving feature. For example, first wedge 300 features an inner groove 304 and second wedge 400 features an inner groove 404. Furthermore, inner groove 304 may include a neck opening 326 and a wide bar opening 328. Neck opening 326 and wide bar opening 328 may both be channels in which neck opening 326 is narrower than wide bar opening 328. In some embodiments, neck opening 326 and wide bar opening 328 form a T-shaped opening. Similarly, inner groove 404 may feature a neck opening 426 and a wide bar opening 428. Neck opening 426 and wide bar opening 428 may be structurally similar to neck opening 326 and wide bar opening 328, respectively.

Slider 200 may include guide features extending from a body 218, such as first guide feature 202 and second guide feature 204. First guide feature 202 may include a neck portion 220 and a wide bar portion 222. Neck portion 220 may extend from first side 206 of body 218, and wide bar portion 222 may extend from neck portion 220. Neck portion 220 may feature a narrower width than wide bar portion 222. Neck portion 220 may be a narrow connecting portion. Wide bar portion 222 may be a flat and wide platform. Wide bar portion 222 may be shaped to slide within wide bar opening 328 of first wedge 300 or a similar opening of second wedge 400. In some embodiments, neck portion 220 and wide bar portion 222 form a T-shaped extrusion. Neck opening 326 and wide bar opening 328 may be sized to accommodate neck portion 220 and wide bar portion 222, respectively. Similarly, second guide feature 204 may include a neck portion 224 and a wide bar portion 226. Neck portion 224 and wide bar portion 226 may be structurally similar to neck portion 220 and wide bar portion 222, respectively. Wide bar portion 226 may be shaped to slide within wide bar opening 328 of first wedge 300 or a similar opening of second wedge 400. In some embodiments, neck portion 224 and wide bar portion 226 form a T-shaped extrusion. Neck opening 426 and wide bar opening 428 may be sized to accommodate neck portion 224 and wide bar portion 226, respectively.

First guide feature 202 may extend through inner groove 304 and second guide feature 204 may extend through inner groove 404. In some embodiments, neck portion 220 of slider 200 may be located within neck opening 326 of first wedge 300, and neck portion 224 of slider 200 may be located within neck opening 426 of second wedge 400. Furthermore, wide bar portion 222 of slider 200 may be located within wide bar opening 328 of first wedge 300, and wide bar portion 226 of slider 200 may be located within wide bar opening 428 of second wedge 400.

FIG. 5 is a perspective view of an alternative embodiment of wedge assembly 100. As shown, axial retainer slot 312 of first wedge 300 may be a snap ring slot that extends from a first face 322 to a second face 324 opposite first face 322. Similarly, axial retainer slot 412 of second wedge 400 may be a snap ring slot that extends from a first face 422 to a second face 424 opposite first face 422. Furthermore, axial retainer 152 may be a snap ring. A snap ring may be a fastening ring that secures fastener 150 within a groove. Although not clearly shown, fastener body 156 may feature a retainer groove 158. Retainer groove 158 may be a groove extending a small depth into fastener body 156. As shown, axial retainer 152 may be positioned around retainer groove 158. Axial retainer 152 may extend outwards from retainer groove 158, and may also extend outwards from the outer surface of fastener body 156. In such embodiments, axial retainer 152 may be coupled to fastener 150 after assembly of first wedge 300, second wedge 400, slider 200, and fastener 150 is completed, as will be explained below.

FIG. 6 is a perspective view of slider 200 of the wedge assembly 100 of FIG. 2. As shown in the figure, body 218 of slider 200 may be an elongated tapered wedge. Wide end 214 of body 218 may have a greater width than narrow end 216 of body 218. Furthermore, slider 200 includes first guide feature 202 extending along first side 206, and second guide feature 204 extending along second side 208. First guide feature 202 and second guide feature 204 may each extend from wide end 214 to narrow end 216 of slider 200. Hole 210 may extend from narrow end 216 a certain depth into body 218.

FIG. 7 is a perspective view of first wedge 300 of the wedge assembly 100 of FIG. 2. As shown in the figure, first wedge 300 may be an elongated tapered wedge. Wide end 314 may have a greater width than narrow end 316. First wedge 300 includes inner groove 304 and outer groove 302 (shown in FIG. 2). Inner groove 304 may be a receiving feature. Inner groove 304 may extend along an interior side 306, and outer groove 302 may extend along an exterior side 318. Inner groove 304 may extend from approximate wide end 314 to axial retainer slot 312 of first wedge 300. Furthermore, first wedge 300 may include a fastener interface section 320 located at narrow end 316. Fastener interface section 320 may include a plurality of slots or grooves such as fastener groove 308, fastener head slot 310, and axial retainer slot 312. Although not shown here, second wedge 400 may be similar to first wedge 300.

In some embodiments, first wedge 300, second wedge 400, and slider 200 are composed of metal. In some embodiments, first wedge 300, second wedge 400, and slider 200 are composed of steel.

INDUSTRIAL APPLICABILITY

Dragline bucket rigging equipment can be used for mining applications and general earth moving operations. Dragline bucket rigging equipment may include a hoist assembly such as hoist assembly 500 shown in FIG. 1. Hoist assembly 500 may utilize rope fastened to a socket by a wedge, such as wedge assembly 100. The rope, wedge, and socket assembly may be used in connection with other dragline bucket rigging equipment components to lift heavy loads. Wedge assembly 100 may provide for convenient disassembly of wedge assembly 100 from within socket 502. Wedge assembly 100 may not require the use of a hammer to release or disassemble wedge assembly 100 from socket 502. Wedge assembly 100 may utilize fastener 150 to expand or contract wedge assembly 100 to allow assembly to or release from socket 502.

In one implementation, as shown in FIG. 2, wedge assembly 100 may be assembled as follows. First wedge 300 may be assembled with slider 200 by sliding first guide feature 202 of slider 200 (see FIG. 6) into inner groove 304 of first wedge 300 (see FIG. 7). Similarly, second wedge 400 may be assembled with slider 200 by sliding second guide feature 202 of slider 200 into inner groove 404 of second wedge 400. In some embodiments, fastener 150 may first be inserted into slider 200 before first wedge 300 and second wedge 400 are assembled onto slider 200. In such embodiments, axial retainer 152 may be a disc or a snap ring. In other embodiments, fastener 150 may be inserted into slider 200 after one of first wedge 300 or second wedge 400 is assembled onto slider 200. In such embodiments, axial retainer 152 may be a disc or a snap ring.

In another implementation, as shown in FIG. 5, fastener 150 may be inserted into slider 200 after first wedge 300 and second wedge 400 are assembled onto slider 200. Axial retainer 152 may be assembled onto fastener 150 after fastener 150 is inserted into slider 200. In such embodiments, axial retainer 152 may be a snap ring. Axial retainer 152 may be inserted into both axial retainer slots 312 and 412. Axial retainer 152 may then contact retainer groove 158 of fastener body 156. With sufficient force applied to axial retainer 152 against retainer groove 158, axial retainer 152 may be snapped around retainer groove 158. The inner surfaces of retainer groove 158 may provide sufficient frictional forces against axial retainer 152 to fix axial retainer 152 to fastener 150. In such an embodiment, fastener 150, axial retainer 152, first wedge 300, and second wedge 400 may all be fixed to one another.

In one implementation, wedge assembly 100 may be expanded or contracted as follows. Referring to FIG. 3, fastener body 156 may be inserted into threaded hole 210 of slider 200. Fastener 150 may be rotated about axis 194 in a clockwise direction (indicated by arrow 190 shown in FIG. 2) or in a counterclockwise direction (indicated by arrow 192 shown in FIG. 2). Fastener 150 may be rotated by operation of a tool, such as a screwdriver or a wrench. The rotational movement of fastener 150 may be converted into an axial movement of slider 200. This may be due to the fixing of fastener 150 to first wedge 300 and second wedge 400. Fastener 150 may be fixed within fastener grooves 308 and 408 of first wedge 300 and second wedge 400. Fastener 150 may be fixedly attached to axial retainer 152. In one embodiment, axial retainer 152 is a circular disc extending from fastener body 156 of fastener 150 (see FIG. 3). In another embodiment, axial retainer 152 is a snap ring positioned around retainer groove 158 of fastener body 156 (see FIG. 5). In both embodiments, axial retainer 152 is axially secured within axial retainer slots 312 and 412. Because axial retainer 152 is fixedly attached to fastener 150, in which fastener 150 may not shift axially within axial retainer 152, fastener 150 is also axially secured to axial retainer slots 312 and 412. Axial retainer 152 and axial retainer slots 312 and 412 combine to prevent fastener 150 from shifting axially between first wedge 300 and second wedge 400. Instead, slider 200 may move in an axial direction between first wedge 300 and second wedge 400 due to the rotation of fastener 150.

The axial movement of slider 200 may be in a direction of arrow 112 and a direction of arrow 114. In some embodiments, the clockwise rotation of fastener 150 in the direction of arrow 190 (see FIG. 2) translates into an inwards axial movement of slider 200 in the direction of arrow 114. Furthermore, the counterclockwise rotation of fastener 150 in the direction of arrow 192 (see FIG. 2) translates into an outwards axial movement of slider 200 in the direction of arrow 112. The axial movement of slider 200 may decrease or increase a throat distance 104. Throat distance 104 may be the clearance between narrow end 216 of slider 200 and axial retainer 152. In some embodiments, throat distance 104 may range from approximately 0.12 inch to 5 inches.

The outwards and inwards axial movement of slider 200 in the directions of arrows 112 and 114 may correspond to the expansion and contraction of a width 102 of wedge assembly 100. Width 102 may be defined by the distance between the outer most edges of first wedge 300 and second wedge 400 relative to axis 194. Furthermore, the distance between the outer most edges of first wedge 300 and second wedge 400 may be restrained by the positioning of first wedge 300 and second wedge 400 relative to slider 200. As described above, first wedge 300 and second wedge 400 may be slidably secured to slider 200 due to the engagement of receiving features of first wedge 300 and second wedge 400 and the guide features of slider 200. In an expanded state, as shown in the figure, wide ends 314 and 414 of first wedge 300 and second wedge 400, respectively, are proximate wide end 214 of slider 200. Because slider 200 is tapered in which wide end 214 has a greater width than narrow end 216, and first wedge 300 and second wedge 400 are tapered in a similar fashion, width 102 is greatest when wide ends 314 and 414 are proximate wide end 214. As slider 200 slides away from first wedge 300 and second wedge 400 in the direction of arrow 112 (due to the counterclockwise rotation of fastener 150), wide end 214 becomes distal to wide ends 314 and 414. Due to the tapered shape of slider 200, first wedge 300 and second wedge 400 may now be positioned on a narrower portion of slider 200. This leads to first wedge 300 and second wedge 400 contracting closer together to one another and thus decreases width 102. In a contracted state, wedge assembly 100 may have a width 102 of at least 3 inches. In an expanded state, wedge assembly 100 may have a width 102 of about 28 inches. In an expanded state, wedge assembly 100 may have a width 102 ranging from 3 inches to 28 inches.

To assemble wedge assembly 100 and rope 504 into socket 502, wedge assembly 100 may first be in an expanded state. If wedge assembly 100 is in a loosened or contracted state, wedge assembly 100 may have to be expanded to the expanded state by rotating fastener 150. An operator may rotate fastener 150 in a clockwise direction as indicated by arrow 190 of FIG. 2, which may draw slider 200 inwards as indicated by arrow 114. This may shift first wedge 300 and second wedge 400 towards wider portions of slider 200, which increases width 102 of wedge assembly 100. The operator may keep rotating fastener 150 in the clockwise direction until wedge assembly 100 reaches the expanded state. This may occur when slider 200 reaches axial retainer slot 412 or by reaching a certain throat distance 104. Wedge assembly 100 may then be positioned within socket 502. Rope 504 may extend through aperture 508 of socket 502, loop around outer groove 302 and 402 of first wedge 300 and second wedge 400 within cavity 510, and extend back out through aperture 508. Wedge assembly 100 and rope 504 may be cinched tightly within cavity 510 due to the compression forces of rope 504 against the interior surfaces of cavity 510.

To release wedge assembly 100 out of socket 502, the opposite process may occur. An operator may rotate fastener 150 in a counterclockwise direction as indicated by arrow 192 of FIG. 2, which may push slider 200 outwards as indicated by arrow 112. This may shift first wedge 300 and second wedge 400 towards narrower portions of slider 200, which decreases width 102 of wedge assembly 100. The operator may keep rotating fastener 150 in the counterclockwise direction until wedge assembly 100 reaches a contracted state. The contracted state may occur when first wedge 300, second wedge 400, and rope 504 are sufficiently loose from the interior surfaces of cavity 510.

The preceding detailed description is merely exemplary in nature and is not intended to limit the invention or the application and uses of the invention. The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A releasable wedge assembly for holding a rope in a socket, the wedge assembly comprising: an inner wedge including
    a tapered body,
    a threaded hole extending into the tapered body, a first guide feature extending along one side of the tapered body, a second guide feature extending along the opposite side of the tapered body from the first guide feature;
    a first outer wedge including a receiving feature, the receiving feature of the first outer wedge configured to receive the first guide feature of the inner wedge;
    a second outer wedge including a receiving feature, the receiving feature of the second outer wedge configured to receive the second guide feature of the inner wedge; and
    a threaded fastener insertable into the threaded hole of the tapered body and configured to axially actuate the inner wedge along the receiving features of the first outer wedge and the second outer wedge.

2. The wedge assembly of claim 1, wherein the first outer wedge includes a fastener groove adjacent an axial retainer slot, and the second outer wedge includes a fastener groove adjacent an axial retainer slot.

3. The wedge assembly of claim 2, wherein the threaded fastener is configured to extend through the fastener grooves of the first outer wedge and the second outer wedge.

4. The wedge assembly of claim 3, further comprising an axial retainer fixedly attachable to the threaded fastener, the axial retainer configured to extend through the axial retainer slots of the first outer wedge and the second outer wedge.

5. The wedge assembly of claim 4, wherein the axial retainer and the axial retainer slots of the first outer wedge and the second outer wedge are configured to axially fix the threaded fastener to the fastener grooves of the first outer wedge and the second outer wedge.

6. The wedge assembly of claim 1, wherein the first outer wedge and the second outer wedge each include an outer groove, the outer grooves of the first outer wedge and the second outer wedge defining an outer periphery to receive the rope.

7. The wedge assembly of claim 1, wherein rotation of the threaded fastener is configured to axially actuate the inner wedge along the receiving features of the first outer wedge and the second outer wedge.

8. The wedge assembly of claim 7, wherein axially actuating the inner wedge along the receiving features of the first outer wedge and the second outer wedge alters the width of the wedge assembly.

9. The wedge assembly of claim 8, wherein actuating the inner wedge in a first axial direction contracts the wedge assembly and releases the wedge assembly from the socket.

10. The wedge assembly of claim 8, wherein actuating the inner wedge in a second axial direction expands the wedge assembly to secure the rope to the socket.

11. A wedge and socket assembly for holding a rope comprising:
    a socket defining a cavity having one end narrower than the opposite end; a wedge assembly insertable into the cavity of the socket, the wedge assembly including
    an inner wedge including
    a tapered body,
    a threaded hole extending into the tapered body, a first guide feature extending along one side of the tapered body,
    a second guide feature extending along the opposite side of the tapered body from the first guide feature; a first outer wedge including a receiving feature, the receiving feature of the first outer wedge configured to receive the first guide feature of the inner wedge;
    a second outer wedge including a receiving feature, the receiving feature of the second outer wedge configured to receive the second guide feature of the inner wedge; and
    a threaded fastener insertable into the threaded hole of the tapered body and configured to axially actuate the inner wedge along the receiving features of the first outer wedge and the second outer wedge.

12. The wedge and socket assembly of claim 11, further comprising an axial retainer fixedly attachable to the threaded fastener, the axial retainer configured to extend through an axial retainer slot of the first outer wedge and an axial retainer slot of the second outer wedge.

13. The wedge and socket assembly of claim 12, wherein the axial retainer and the axial retainer slots of the first outer wedge and the second outer wedge are configured to axially fix the threaded fastener to the first outer wedge and the second outer wedge.

14. The wedge and socket assembly of claim 11, wherein the first outer wedge and the second outer wedge each include an outer groove, the outer grooves of the first outer wedge and the second outer wedge defining an outer periphery to receive the rope.

15. The wedge and socket assembly of claim 14, wherein the outer grooves of the first and second outer wedge are configured to compress the rope against an interior surface of the cavity.

16. The wedge and socket assembly of claim 11, wherein rotation of the threaded fastener is configured to axially actuate the inner wedge along the receiving features of the first outer wedge and the second outer wedge.

17. A releasable wedge assembly for holding a rope in a socket, the wedge assembly comprising:
    a slider including
        a tapered body having a narrow end and a wide end opposite the narrow end, and
        a threaded hole extending into the tapered body at the narrow end;
    a first wedge slidably attachable to the slider, the first wedge including an axial retainer slot;
    a second wedge slidably attachable to the slider, the second wedge including an axial retainer slot;
    a threaded fastener insertable into the threaded hole of the slider, the threaded fastener configured to axially actuate the slider along the inner grooves of the first wedge and the second wedge; and
    an axial retainer fixedly attachable to the threaded fastener,
        the axial retainer insertable into the axial retainer slots of the first wedge and the second wedge.

18. The wedge assembly of claim 17, wherein the slider includes
    a first extrusion extending from the narrow end to the wide end along one side of the slider, and a second extrusion extending from the narrow end to the wide end along the opposite side of the slider from the first extrusion.

19. The wedge assembly of claim 18, wherein the first wedge includes an inner groove configured to receive the first extrusion of the slider, and the second wedge includes an inner groove configured to receive the second extrusion of the slider.

20. The wedge assembly of claim 19, wherein the inner groove of the first wedge and the inner groove of the second wedge are T-shaped grooves, and the first extrusion and the second extrusion are T-shaped extrusions.

* * * * *